United States Patent [19]
Winters et al.

[11] Patent Number: 5,273,733
[45] Date of Patent: Dec. 28, 1993

[54] PROCESS FOR THE PRODUCTION OF CHLORINE DIOXIDE

[75] Inventors: John R. Winters, Marietta; John M. Gray, Roswell; Joel D. Tenney, Atlanta, all of Ga.

[73] Assignee: EKA Nobel Inc., Marietta, Ga.

[21] Appl. No.: 895,720

[22] Filed: Jun. 9, 1992

Related U.S. Application Data

[63] Continuation-in-part of Ser. No. 868,223, Apr. 14, 1992, abandoned.

[51] Int. Cl.$^5$ ............................................. C01B 11/02
[52] U.S. Cl. ...................................... 423/477; 423/478
[58] Field of Search ................. 423/477, 478; 204/101, 204/103, 95

[56] References Cited

U.S. PATENT DOCUMENTS

| | | | |
|---|---|---|---|
| 3,810,969 | 5/1974 | Schlumberger | 423/478 |
| 3,869,401 | 3/1975 | Ernst | 473/272 |
| 4,915,927 | 4/1990 | Lipsztan | 204/103 |
| 5,106,465 | 4/1992 | Kaczur | 423/477 |

*Primary Examiner*—Gary P. Straub
*Assistant Examiner*—Valerie Ann Lund
*Attorney, Agent, or Firm*—Burns, Doane, Swecker & Mathis

[57] ABSTRACT

A process for the production of chlorine dioxide by reacting at least one of chloric acid and an alkali metal chlorate, and hydrogen peroxide as the reducing agent in such proportions that chlorine dioxide is produced in a reaction medium. A mixture comprising chlorine dioxide and oxygen is withdrawn from the reaction medium. Urea and/or one or more phosphonic acid based complexing agents are added to the reaction medium. The stabilizer is added in an amount of 0.01–5 weight % and serves to increase the reaction rate.

19 Claims, No Drawings

PROCESS FOR THE PRODUCTION OF CHLORINE DIOXIDE

CROSS-REFERENCE TO RELATED APPLICATION

This application is a continuation-in-part of application Ser. No. 07/868,223, filed Apr. 14, 1992, now abandoned.

BACKGROUND OF THE INVENTION
1. Field of the Invention

The present invention relates to a process for the production of chlorine dioxide from an alkali metal chlorate, a mineral acid and hydrogen peroxide as the reducing agent. The invention also relates to a process for the production of chlorine dioxide from chloric acid or a mixture of chloric acid and alkali metal chlorate. More particularly, the invention relates to production of chlorine dioxide in the presence of a complexing agent. Chlorine dioxide used in aqueous solution is of considerable commercial interest, mainly in pulp bleaching, but also in water purification, fat bleaching, removal of phenols from industrial wastes, etc. It is therefore desirable to provide processes in which chlorine dioxide can be efficiently produced.

2. Description of the Related Art

There are a lot of different processes for chlorine dioxide production. The most commonly used reducing agents are chloride ions, methanol and sulphur dioxide. The draw back with chloride ions as the reducing agent is the formation of half a mole of chlorine for each mole of chlorine dioxide formed. Increasing environmental demands have brought about a change over to reducing agents which do not produce chlorine as a by-product, mainly methanol. A draw back with methanol as the reducing agent can be the formation of chlorinated organic compounds, from by-products of methanol, in the bleaching train. It is well known that the efficiency of the added methanol is lowered due to side reactions where formaldehyde and formic acid are formed. Also some of the methanol leaves the reactor without having participated in the reduction. The corresponding ether and ester are probably there as well. It could be expected that reactions can occur in the bleaching train with the aldehyde, acid, ether and ester resulting in chlorinated organic compounds. The reduction with methanol is also rather slow at low acid strength in the interval 2-5N if catalysts are not incorporated.

In U.S. Pat. Nos. 5,091,167 and 5,091,166 it was found that hydrogen peroxide was a surprisingly effective reducing agent in the whole acid interval 2-11N. It was found that with hydrogen peroxide as the reducing agent it is possible to obtain a process with a very high reaction rate and efficiency and in the interval 2-5N for the acid strength, the reaction rate exceeded the rate of known processes with several hundreds percent without the aid of catalysts. It was also possible to produce essentially chlorine free chlorine dioxide. The following formula illustrate the reaction for acidities of 2-5N:

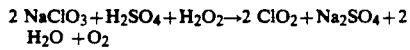
$2\ NaClO_3 + H_2SO_4 + H_2O_2 \rightarrow 2\ ClO_2 + Na_2SO_4 + 2\ H_2O + O_2$ and

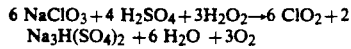
$6\ NaClO_3 + 4\ H_2SO_4 + 3H_2O_2 \rightarrow 6\ ClO_2 + 2\ Na_3H(SO_4)_2 + 6\ H_2O + 3O_2$ for acidities of 5-11N.

SUMMARY OF THE INVENTION

In the continuing work to obtain effective chlorine dioxide manufacturing processes it was surprisingly found that in the process using hydrogen peroxide as the reducing agent certain special stabilizers for hydrogen peroxide have a positive influence on the chlorine dioxide formation. The rate for the chlorine dioxide formation was increased to a great extent compared with the reaction without the stabilizer. An increase in the rate from about 15-50% could be observed.

Thus, one embodiment of the present invention, as claimed in the claims, relates to a process for the production of chlorine dioxide by reacting an alkali metal chlorate, mineral acid and hydrogen peroxide as the reducing agent in such proportions that chlorine dioxide is produced in a reaction medium which is maintained at a temperature of from about 30° C. to about 100° C. and at an acidity within a range of from about 2 to about 11N. A mixture comprising chlorine dioxide and oxygen is withdrawn from the reaction vessel. The reaction is characterized in that a stabilizer, chosen from the group consisting of urea and phosphonic acid based complexing agents is added to the reaction medium. It was found that when urea or a phosphonic acid based complexing agent was added to the reaction medium a process with a very high reaction rate of chlorine dioxide production is obtained. This was a great surprise as the reason for the addition of the stabilizer was to stabilize the hydrogen peroxide and not to influence chlorine dioxide production as such.

In another embodiment of the invention, chlorine dioxide is produced in a reaction medium by reacting chloric acid with hydrogen peroxide as the reducing agent under conditions similar to those above. In still other embodiments, the reaction medium contains a mixture of chloric acid and alkali metal chlorate. The alkali metal chlorate in the mixture may or may not react to form chlorine dioxide, depending on the presence in the reaction medium of a mineral acid such as sulfuric acid. In all embodiments, the reaction medium also contains urea or one or more phosphonic acid based complexing agents.

DETAILED DESCRIPTION OF THE PREFERRED EMBODIMENTS

Hydrogen peroxide in the form of pure solutions without contaminations are highly stable. However, it is well known that hydrogen peroxide solutions contain traces of impurities such as iron, copper, and other heavy metals which make the hydrogen peroxide unstable. To stabilize the hydrogen peroxide solution small amounts of different kinds of inhibitors are usually included. Numerous examples of stabilizers are known e.g. acetanilide, sodium stannate, sodium silicate. The amount of stabilizer in the hydrogen peroxide solution lies typically within the range 0.01-1 percent by weight.

Urea is one known stabilizer for hydrogen peroxide and phosphonic acid based complexing agents are another group of known stabilizers. As these stabilizers are acids they are suitable for the hydrogen peroxide used in the strong acidic chlorate electrolyte. However, that urea and these complexing agents could have an influence on the chlorine dioxide formation as such has hitherto not been known. When other common stabilizers were tested they showed no other effect than the usual hydrogen stabilization. The theory behind the effect of the urea and the phosphonic acid based complexing agent in the chlorate system is unknown.

The phosphonic acids used are mainly diphosphonic acids and polyphosphonic acids produced from ammonia or ethyleneamines. They are commercially available compounds. As examples of usable compounds the following can be mentioned: 1-hydroxyethylidene-1,1-diphosphonic acid, 1-aminoethane-1,1-diphosphonic acid, aminotri(methylenephosphonic acid), ethylene diaminetetra(methylenephosphonic acid), hexamethylene diaminetetra(methylenephosphonic acid), diethylenetriaminepenta(methylenephosphonic acid). The last one mentioned is a preferred embodiment of the invention.

The effective amount of the stabilizer to be added lies within the interval 0.01-5 percent by weight (based on total amount of hydrogen peroxide), preferably within 0.05-2, most preferably within 0.1-1 percent by weight. The stabilizer can be added as a solution directly to the reactor or it can be added together with the hydrogen peroxide solution.

Though the theory behind the effect of the stabilizer is not exactly known it can be stated that the effect is connected with the chemical system, hydrogen peroxide—stabilizer, as such. Thus the improvement of the effect of the hydrogen peroxide as a reducing agent is independent of the process used for the chlorine dioxide production.

Therefore the present invention can be used with all known chlorine dioxide processes using hydrogen peroxide as the reducing agent Processes run at a normal pressure as well as reduced pressure processes are equally suitable. The invention can be used in batch processes or in continuous processes. All known types of reactors can be used e.g. SVP ® reactors or Mathieson reactors and others.

The chlorine dioxide production is run in a conventional manner. As an example a process is described for a single vessel process run with subatmospheric pressure. However, this shall not be seen as a restriction of the invention. The production of chlorine dioxide according to this type of process is performed in a single reaction vessel, generator—evaporator—crystallizer. A suitable reactor is an SVP ®. The reactants are added continuously to the reactor.

In a first embodiment of the invention, alkali metal chlorate alone is reacted. The alkali metal chlorate is added in an amount to provide a chlorate ion concentration in the reaction vessel which can vary within wide limits, from a low concentration of about 0.25M up to saturation, suitably from about 0.7M up to saturation and preferably from 2.5M up to saturation.

Hydrogen peroxide is added in an amount within the interval from about 0.06 to about 0.6, suitably about 0.16 to about 0.32 ton/ton chlorate, preferably 0.16 to 0.22 ton/ton chlorate. The reaction is suitably operated at a temperature of 50°-100° C., preferably 50°-75° C. and at a pressure below atmospheric pressure, suitably at 60-400 mm Hg. Then the reaction medium boils or water is evaporated in a sufficient amount to dilute the chlorine dioxide formed to a safe concentration.

In the reactor, the alkali metal salt of the mineral acid is continuously crystallized and separated in a suitable manner. The acidity of the reaction medium can be within the range 2 to 11N. It is preferred to run the reaction at an acidity below 9N. If the acidity is kept below about 5N a neutral alkali metal sulphate is obtained when alkali metal chlorate is reacted. The acidity in the reactor is adjusted by adding a mineral acid, preferably sulfuric acid. An addition of a small amount of chloride ions can be appropriate, preferably in the form of alkali metal chloride, so as to maintain the concentration thereof in the reactor within the interval from 0.001 and up to 0.8 moles per liter. Normally conventional, commercially available alkali metal chlorate (without extra added alkali metal chloride) contains not more than about 0.5, often not more than about 0.05, preferably not more than about 0 02, most preferably not more than about 0.01 weight percent alkali metal chloride.

It is preferred to use this conventional alkali metal chlorate in the process, thus to use chlorate without extra added alkali metal chloride.

However, additional alkali metal chloride can be added if it is necessary to obtain the above mentioned chloride content in the reactor.

The process is not restricted to any of the alkali metals, but sodium is the most preferred.

If suitable it is also possible to add other reducing agents such as methanol, formaldehyde, formic acid, sugar alcohols, sulfur dioxide and chloride. Catalyst such as silver, manganese, vanadium, molybdenum, palladium and platinum can also be added if appropriate.

In another embodiment, instead of alkali metal chlorate, chloric acid can be used to produce chlorine dioxide with hydrogen peroxide as the reducing agent with urea or phosphonic acid based complexing agents present to increase the reaction rate.

The reaction between chloric acid and hydrogen peroxide is very rapid even at as low acidities as 1-2N. The reaction is considerably faster than the corresponding reaction in other systems for chlorine dioxide production, such as the chloric acid—methanol system or the sodium chlorate—hydrogen peroxide—sulfuric acid system. Further, no detrimental by-products are obtained, such as salt by-products formed when alkali metal chlorate is used as a raw material and organic by-products formed when methanol is used as a reducing agent. On the other hand, oxygen is obtained as a valuable by-product which is particularly advantageous in paper mills where oxygen is used as a bleaching agent or in biological treatment of waste water. Further, it is possible to produce essentially chlorine-free chlorine dioxide.

According to this embodiment, the reaction medium for chlorine dioxide generation is supplied with an aqueous solution of chloric acid, the reaction being performed in the substantial absence of alkali metal chlorate, thus minimizing the water load of the system. The solution supplied preferably contains from about 10 to about 40% by weight of chloric acid, most preferably from about 15 to about 25% by weight of chloric acid, the balance preferably substantially being water. At too high concentration the chloric acid is unstable. In addition to chloric acid and water, the solution also contains small amounts of the above-mentioned stabilizers and optionally other additives.

In a further embodiment, a mixture of chloric acid and alkali metal chlorate is fed to the reaction medium. In many methods of producing chloric acid, an aqueous solution containing a mixture of chloric acid and alkali metal chlorate is obtained. Thus, in this embodiment of the invention, the reaction medium for chlorine dioxide generation is supplied with a solution containing chloric acid and alkali metal chlorate. The solution containing chloric acid and alkali metal chlorate is preferably produced by an electrochemical process, such as the one described in International Application WO 91/12356, and the solution obtained can be fed directly into the chlorine dioxide reactor.

This embodiment is most economically used in an integrated process which comprises electrolyzing an aqueous solution of alkali metal chlorate so as to obtain a solution containing chloric acid and alkali metal chlorate, feeding the solution to the reaction zone in a chlorine dioxide reactor containing urea and/or one or more phosphonic acid based complexing agents, producing chlorine dioxide by reacting the chloric acid with hydrogen peroxide as a reducing agent, withdrawing the unreacted alkali metal chlorate from the reaction zone, preferably in the form of an aqueous solution, and recycling it to the electrochemical cell, which cell preferably also is supplied with fresh alkali metal chlorate. The fresh alkali metal chlorate can be added to the recycling stream of chlorate or directly to the electrochemical cell.

The alkali metal chlorate withdrawn from the chlorine dioxide generating reaction zone can be purified before it is supplied to the electrochemical cell. However, the use of hydrogen peroxide for the chlorine dioxide production, involves the advantage that no organic by-products are obtained. The solution withdrawn from the reaction zone only contains alkali metal chlorate, some unreacted chloric acid, and possibly small amounts of hydrogen peroxide and chlorine dioxide. Chloric acid causes no harm to electrochemical cells, and hydrogen peroxide and chlorine dioxide are simple to remove, for example by stripping. Although possible, sophisticated purification steps such as crystallization and redissolving are normally not required. If the process is set properly, the content of peroxide and chlorine dioxide is so low that the chlorate solution recycled normally can be directly introduced into the electrochemical cell without any purification or other kind of treatment.

Since chlorine dioxide can be efficiently produced from a feed stream having comparatively low content of chloric acid, the degree of conversion in the electrochemical cell can be kept low, thus increasing the current efficiency. The suitable degree of conversion depends on the electrochemical cell used. In most known cells using standard electrodes and polymeric membranes, such as the one described in the previously mentioned International Patent Application WO 91/12356, the preferred degree of conversion is from about 10 to about 50%, most preferably from about 20 to about 40%. However, the optimal degree of conversion can be higher in other kinds of cells, for example cells using gas electrodes such as hydrogen generating electrodes or cells using high ion conducting membranes such as ceramic membranes. The optimal degree of conversion can be up to 70% or even 90% of more if the electrochemical cell used is very effective.

In yet another embodiment of the invention, a mixture of chloric acid and alkali metal chlorate are fed to the reaction medium, along with hydrogen peroxide, a mineral acid and urea and/or one or more phosphonic acid based complexing agents. In this embodiment, rather than being recycled to an electrolyzer, the alkali metal chlorate is reacted with the mineral acid (e.g. sulfuric acid) to produce chlorine dioxide and a salt cake as a by-product. Mineral acids can be supplied in an amount sufficient for substantially all alkali metal chlorate to react.

As with the first embodiment in which alkali metal chlorate alone is reacted, the reaction of chloric acid and combinations of chloric acid and alkali metal chlorate is preferably carried out in a single reaction vessel, generator-evaporator-crystallizer, such as a SVP® reactor. In the single reactor, the reactants are added continuously. Chloric acid and optionally alkali metal chlorate are added in an amount to provide a chlorate (i.e., $ClO_3$) concentration in the reaction vessel which can vary within wide limits, from a low concentration of about 1M or less up to saturation which normally is about 6M. The preferred concentration is from about 2M up to about 5M. The acidity of the reaction medium can be within the whole range from 0.5 to 12N. It is preferred to run the reaction at an acidity below 5N, most preferably below 4N. Hydrogen peroxide is preferably added in an amount from about 0.4 to about 0.7 mole per mole of chlorine dioxide produced. The reaction is preferably operated at a temperature of 50°-100° C., most preferably 50°-75° C. and at a pressure below atmospheric pressure, suitably at 60-400 mm Hg. The reaction medium boils and water is evaporated in a sufficient amount to dilute the chlorine dioxide formed to a safe concentration.

Although not necessary, an addition of a small amount of chloride ions can be appropriate, preferably in the form of alkali metal chloride, so as to maintain the concentration thereof in the reactor within the range from 0.001 and up to 0.8 mole per liter.

In addition to hydrogen peroxide, it is also possible to add other reducing agents such as methanol, formaldehyde, formic acid, alcohols, sulfur dioxide and chloride. Catalysts such as silver, manganese, vanadium, molybdenum, palladium and platinum can also be added if appropriate.

The method according to the invention is not restricted to any of the alkali metals, but sodium is the most preferred one.

The invention is further illustrated by means of the following examples.

EXAMPLE 1

To a laboratory chlorine dioxide generator a water solution of 70 g/liter chlorate was added with 196 g/liter sulfuric acid. 30% hydrogen peroxide solution was also added such that the hydrogen peroxide concentration in the reactor was 12 g/liter. Diethylenetriaminepenta (methylenephosphonic acid) was added with the hydrogen peroxide solution at a concentration of 1% of the total peroxide solution. The reactor was operated at atmospheric conditions and maintained at 35° C. The chlorine dioxide production rate was $6.7 \times 10^{-3}$ grams/(liter-minute).

EXAMPLE 2

To a laboratory chlorine dioxide generator a water solution of 70 g/liter chlorate was added with 196 g/liter sulfuric acid. 30% hydrogen peroxide solution saw also added such that the hydrogen peroxide concentration in the reactor was 12 g/liter. 1-hydroxyethylidene-1, 1-diphosphonic acid was added with the hydrogen peroxide solution at a concentration of 1% of the total peroxide solution. The reactor was operated at atmospheric conditions and maintained at 35° C. The chlorine dioxide production rate was $6.4 \times 10^{-3}$ grams/(liter-minute).

EXAMPLE 3

To a laboratory chlorine dioxide generator a water solution of 70 g/liter chlorate was added with 196 g/liter sulfuric acid. 30% hydrogen peroxide solution was also added such that the hydrogen peroxide concentration in the reactor was 12 g/liter. No stabilizer was added with the hydrogen peroxide solution. The reactor was operated at atmospheric conditions and maintained at 35° C. The chlorine dioxide production rate was $5.3 \times 10^{-3}$ grams/(liter-minute).

EXAMPLE 4

To a laboratory chlorine dioxide generator a water solution of 70 g/liter chlorate was added with 196 g/liter sulfuric acid. 30% hydrogen peroxide solution was also added such that the hydrogen peroxide concentration in the reactor was 12 g/liter. Phosphoric acid was added with the hydrogen peroxide solution at a concentration of 1% of the total peroxide solution. The reactor was operated at atmospheric conditions and maintained at 35° C. The chlorate dioxide production rate was $5.3 \times 10^{-3}$ grams/(liter-minute).

EXAMPLE 5

To a laboratory chlorine dioxide generator a water solution of 70 g/liter chlorate was added with 196 g/liter sulfuric acid. 30% hydrogen peroxide solution was also added such that the hydrogen peroxide concentration in the reactor was 12 g/liter. Sodium stannate was added with the hydrogen peroxide solution at a concentration of 1% of the total peroxide solution. The reactor was operated at atmospheric conditions and maintained at 35° C. The chlorine dioxide production rate was $5.2 \times 10^{-3}$ grams/(liter-minute).

EXAMPLE 6

To a laboratory chlorine dioxide generator a water solution of 319.5 g/liter chlorate was added continuously. Sulfuric acid was added at 196.2 g/liter together with hydrogen peroxide at 6.4 g/liter. Diethylenetriaminepenta (methylenephosphonic acid) was added with the hydrogen peroxide acid solution at a concentration of 1% of the total solution. The reactor was operated continuously at 65° C. with an absolute pressure of 350 mm Hg, i.e. below atmospheric pressure. The chlorine dioxide production rate was 1.38 grams/(liter-minute).

EXAMPLE 7

To a laboratory chlorine dioxide generator a water solution of 319.5 g/liter chlorate was added continuously. Sulfuric acid was added at 196.2 g/liter together with hydrogen peroxide at 6.4 g/liter. No stabilizer was added with the hydrogen peroxide acid solution. The reactor was operated continuously at 65° C. with an absolute pressure of 350 mm Hg, i.e. below atmospheric pressure. The chlorine dioxide production rate was 1.14 grams/(liter-minute).

EXAMPLE 8

To a laboratory chlorine dioxide generator a water solution of 70 g/liter chlorate was added with 196 g/liter sulfuric acid. 30% hydrogen peroxide solution was also added such that the hydrogen peroxide concentration in the reactor was 12 g/liter. Urea was added with the hydrogen peroxide solution at a concentration of 1% of the total hydrogen peroxide solution. The reactor was operated at atmospheric conditions and maintained at 35° C. The chlorine dioxide production rate as $7.62 \times 10^{-3}$ g/(liter-minute).

What is claimed is:

1. A process for the production of chlorine dioxide, comprising reacting at least one of chloric acid and an alkali metal chlorate to produce chlorine dioxide using hydrogen peroxide as the sole reducing agent, the reaction taking place in a reaction medium maintained at a temperature of from about 30° C. to about 100° C. and at an acidity within the range of from about 0.5 to about 12N, thereby producing a mixture comprising chlorine dioxide and oxygen, the process including the step of adding to said reaction medium a compound selected from the group consisting of urea, 1-hydroxyethylidene-1,1-diphosphonic acid, 1-aminoethane-1,1-diphosphonic acid, aminotri(methylenephosphonic acid), ethylene diaminetetra(methylenephosphonic acid), hexamethylene diaminetetra(methylenephosphonic acid), diethylenetriaminepenta(methylenephosphonic acid), and mixtures thereof.

2. A process according to claim 1, wherein the compound is added in an amount sufficient to increase the rate of chlorine dioxide production in said process compared to a similar said process in which said compound is not added.

3. A process according to claim 1, wherein the compound is present in the reaction medium in an amount of from 0.01 to 5 wt % based on total hydrogen peroxide.

4. A process according to claim 1, wherein the compound is diethylenetriaminepenta(methylenephosphonic acid).

5. A process according to claim 1, wherein the compound is 1-hydroxyethylidene-1,1 diphosphonic acid.

6. A process according to claim 1, wherein the reaction medium is subjected to subatmospheric pressure during the reaction.

7. A process according to claim 1, wherein said hydrogen peroxide is used in an amount of from about 0.06 to about 0.6 ton/ton chlorate.

8. A process according to claim 1, wherein the chlorate concentration is from about 0.25M up to saturation in the reaction medium.

9. A process according to claim 1, wherein conventional alkali metal chlorate containing not more than about 0.5 weight percent alkali metal chloride is used in the process.

10. A process according to claim 1, wherein additional alkali metal chloride is added to obtain a concentration of 0.001 to 0.8 moles per liter in the reaction medium.

11. A process according to claim 1, wherein the feed is chloric acid.

12. A process as claimed in claim 1, wherein the feed is an alkali metal chlorate and the reaction is carried out in the presence of a mineral acid.

13. A process as claimed in claim 12, wherein said mineral acid is sulfuric acid.

14. A process as claimed in claim 12, wherein mineral acid is added to the reaction medium.

15. A process as claimed in claim 1, wherein a mixture of chloric acid and alkali metal chlorate are fed to the reaction medium, and chlorine dioxide is produced by reaction of the chloric acid in said mixture.

16. A process as claimed in claim 15, wherein the reaction is performed in the substantial absence of mineral acids other than chloric acid.

17. A process as claimed in claim 1, wherein a mixture of chloric acid and alkali metal chlorate are fed to the reaction medium, and chlorine dioxide is produced by reaction of the chloric acid and alkali metal chlorate in said mixture, wherein said reaction medium also includes a mineral acid.

18. A process as claimed in claim 17, wherein the mineral acid is sulfuric acid.

19. A process for the production of chlorine dioxide, consisting essentially of reacting at least one of chloric acid and an alkali metal chlorate to produce chlorine dioxide using hydrogen peroxide as the sole reducing agent, the reaction taking place in a reaction medium maintained at a temperature of from about 30° C. to about 100° C. and at an acidity within the range of from about 0.5 to about 12N, thereby producing a mixture comprising chlorine dioxide and oxygen, the process including the step of adding to said reaction medium a compound selected from the group consisting of urea, 1-hydroxyethylidene-1,1-diphosphonic acid, 1-aminoethane-1,1-diphosphonic acid, aminotri(methylenephosphonic acid), ethylene diaminetetra(methylenephosphonic acid), hexamethylene diaminetetra(methylenephosphonic acid), diethylenetriaminepenta(methylenephosphonic acid), and mixtures thereof.

* * * * *